US009082455B2

(12) United States Patent
Feng et al.

(10) Patent No.: US 9,082,455 B2
(45) Date of Patent: Jul. 14, 2015

(54) DIGITAL PARTIAL RESPONSE ASYMMETRY COMPENSATION

(75) Inventors: Qilong Feng, Villingen-Schwenningen (DE); Marten Kabutz, Villingen-Schwenningen (DE)

(73) Assignee: Thomson Licensing, Issy-les-Moulineaux (FR)

( * ) Notice: Subject to any disclaimer, the term of this patent is extended or adjusted under 35 U.S.C. 154(b) by 1835 days.

(21) Appl. No.: 10/558,059

(22) PCT Filed: May 15, 2004

(86) PCT No.: PCT/EP2004/005245
§ 371 (c)(1),
(2), (4) Date: Nov. 22, 2005

(87) PCT Pub. No.: WO2004/107325
PCT Pub. Date: Dec. 9, 2004

(65) Prior Publication Data
US 2007/0070865 A1    Mar. 29, 2007

(30) Foreign Application Priority Data
May 27, 2003   (EP) .................................. 03011891

(51) Int. Cl.
*G11B 7/00*         (2006.01)
*G11B 5/09*         (2006.01)
(Continued)

(52) U.S. Cl.
CPC .. *G11B 20/10212* (2013.01); *G11B 2020/1288* (2013.01); *G11B 2220/2541* (2013.01)

(58) Field of Classification Search
CPC . G11B 7/00; G11B 7/24073; G11B 20/10324

USPC .................. 369/59.17, 59.18, 59.22, 124.11
See application file for complete search history.

(56) References Cited

U.S. PATENT DOCUMENTS 5,450,389 A  *  9/1995   Hayashi ..................... 369/59.15
5,835,510 A     11/1998  Hayashi
(Continued)

FOREIGN PATENT DOCUMENTS

JP    5-334803    12/1993
JP    9-8674      1/1997
(Continued)

OTHER PUBLICATIONS

C. A. Laber et al. "A 20 MHZ Sixth-Order BICMOS Parasitic-Insensitive Continuous-Time Filter and Second-Order Equalizer Optimized for Disk-Drive Read Channels", IEEE Journal of Solid-State Circuit, IEEE Inc, New York US, vol. 28, No. 4, Apr. 1, 1993. pp. 462-470.
(Continued)

*Primary Examiner* — Aneeta Yodichkas
(74) *Attorney, Agent, or Firm* — Myers Wolin LLC

(57)                 ABSTRACT

A method is provided for receiving and restoring data from an optical recording medium exhibiting strong asymmetry in the regenerated RF signal. The method provides digital partial response asymmetry compensation of a digital RF signal. The asymmetry of the digital RF signal is detected through the measurement of the envelopes of a short T pulse (xT pulse) and a long T pulse (yT pulse), where the T is the bit clock of the recovered bit stream. Through the evaluation of the xT upper and lower envelopes and the asymmetry factor, upper and lower thresholds are determined. Only the asymmetric parts of the digital RF signal are selected and compensated.

18 Claims, 6 Drawing Sheets

(51) Int. Cl.
*G11B 20/10* (2006.01)
*G11B 27/36* (2006.01)
*H04N 5/76* (2006.01)
*G11B 20/12* (2006.01)

(56) References Cited

U.S. PATENT DOCUMENTS

| | | | |
|---|---|---|---|
| 6,324,135 B1 | | 11/2001 | Kim et al. |
| 6,483,793 B1 | * | 11/2002 | Kim .................. 369/59.22 |
| 6,557,126 B1 | * | 4/2003 | Kelly .................... 714/708 |
| 6,665,250 B1 | * | 12/2003 | Minamino et al. ......... 369/59.1 |
| 2001/0006500 A1 | * | 7/2001 | Nakajima et al. ......... 369/47.35 |
| 2001/0016002 A1 | * | 8/2001 | Shim et al. ................. 375/232 |
| 2002/0172112 A1 | | 11/2002 | Shoji et al. |

FOREIGN PATENT DOCUMENTS

| | | |
|---|---|---|
| JP | 10-320920 | 12/1998 |
| JP | 2000-013748 | 1/2000 |
| JP | 2000-339862 | 12/2000 |
| JP | 2001250334 | 9/2001 |
| KR | 2002-0057730 | 7/2002 |
| SU | 1356242 | 11/1987 |

OTHER PUBLICATIONS

J. Kovacs, R. Kroesen, A. Haun: "Read-Channel Processor Uses PRML to Increase Capacity of MR Head-Based Disk Drives" 'Online', p. 2.

C. Petersen et al: "A 3-5.5 V CMOS 32 Mb/s fully-integrated read channel for disk-drives" Custom Integrated Circuits Conference, 1993, proceedings of the ieee 1993 san diego, ca. us May 9-12, 1993 New York, NY, May 9, 1993, pp. 1021-1024.

Search Report Dated Dec. 6, 2004.

Patent Abstracts of Japan, vol. 2000, No. 04, Aug. 31, 2000 & JP 2000 013748 (Sharp Corp), Jan. 14, 2000 (See Ref. AB).

C. A. Laber et al. "A 20 MHZ Sixth-Order BICMOS Parasitic-Insensitive Continuous-Time Filter and Second-Order Equalizer Optimized for Disk-Drive Read Channels", IEEE Journal of Solid-State Circuit, IEEE Inc, New York US, vol. 28, No. 4, Apr. 1, 1993, pp. 462-470.

Takehara et al., "Combined adaptive controlled PRML signal processing for high-density optical disk", Japanese Journal of Applied Physics, Part 1 (Regular Papers, Short Notes & Review Papers), vol. 42, No. 2B, Feb. 2003, pp. 924-930.

Arai et al., "Differentiation-based waveform equalization in high density digital magnetic recording" Journal of the Institute of Television Engineers of Japan, vol. 40, No. 6, pp. 488-493, Jun. 1986.

Arai Etal., "Differentiation-based waveform equalization in high density digital magnetic recording", English Abstract, Journal of the Institute of Television Engineers of Japan, vol. 40, No. 6, pp. 488-493, Jun. 1986.

Miyashita et al., "New PRML for asymmetrical signals in high-density optical disks", Japanese Journal of Applied Physics, Part 1 (Regular Papers, Short Notes & Review Papers), vol. 41, No. 3B, Mar. 2002, pp. 1787-1788.

Taub, D., "Correcting read pulse asymmetry". IP.com Electronic Publication, IP.com No. 000089383, Publication Date: Oct. 1, 1977, pp. 1-3.

* cited by examiner

DIGITAL PARTIAL RESPONSE ASYMMETRY COMPENSATION

BACKGROUND OF THE INVENTION (1) Field of the Invention

The present invention relates to a method for receiving and restoring data from an optical recording medium exhibiting strong asymmetry in the regenerated RF signal and an apparatus for reading from and/or writing to recording media using such method. More particularly it relates to a digital partial response asymmetry compensation (DPRAC).

(2) Description of Related Art

Optical recording media such as CD, DVD, or Blu-ray disc, are now widely used almost everywhere, not only in the industry, but also in our daily life. Due to the steadily increasing recording speeds as well as the steadily increasing demands and applications of such high speed and high density recorded optical recording media, the RF signal, which is scanned from the recording medium, becomes more and more deteriorated. Especially the inter-symbol interference (ISI) and the asymmetry of the RF signal are a challenge for signal processing. Therefore, the development of a system for reliable and fast data restoring from such an optical recording medium having a strong asymmetrical RF signal, has become very important. With conventional methods it is difficult to restore the data correctly and quickly.

SUMMARY OF THE INVENTION

It is, therefore, an object of the present invention to provide a method and an apparatus which solves or greatly improve the above-mentioned problem, and which increase the system performance and improve the quality and validity of processed data obtained from an optical recording medium with a strongly asymmetric signal. Though the invention is explained in the following with reference to optical recording media, the general idea can also be applied to magnetic media (type/disk) as well as to all fields based on digital baseband transmission and communication.

According to the invention, the above object is achieved by means of a method for digital partial response asymmetry compensation of an RF signal, the method comprising the steps of:

detecting the asymmetry β of the RF signal through the measurement of the envelopes of a short T pulse (xT pulse) and a long T pulse (yT pulse), T being the bit clock of the recovered bit stream, determining upper and lower thresholds through the evaluation of the xT upper and lower envelopes and the asymmetry factor β, and selecting and compensating only the asymmetric parts of the input signal RF.

Using this method the asymmetry and the inter-symbol interference in the RF signal are greatly improved, and the quality and validity of the corresponding restored data are increased. Because of the partial response, the asymmetry compensation improves only the asymmetrical RF signal without any additional phase shift and loss of signal quality for the xT pulse signal as well as the zero-crossing signal. The RF signal without asymmetry is not influenced by the digital partial response asymmetry compensation.

BRIEF DESCRIPTION OF THE DRAWINGS

For a better understanding of the invention, exemplary embodiments are specified in the following description of advantageous embodiments with reference to the figures. It is understood that the invention is not limited to these exemplary embodiments and that specified features can also expediently be combined and/or modified without departing from the scope of the present invention. In the figures.

DETAILED DESCRIPTION OF THE INVENTION

Figure 1:
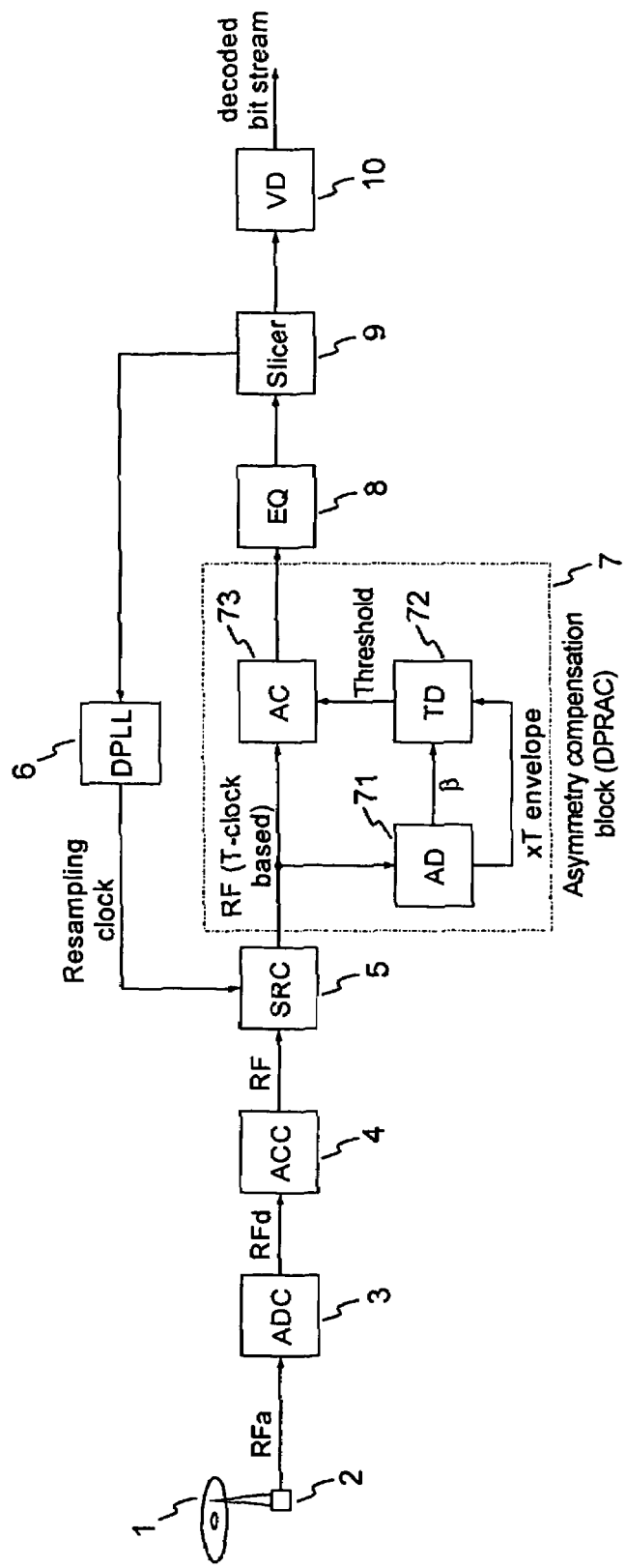
FIG. 1 shows a block diagram of a data restoring system according to the invention.

In FIG. 1 a block diagram of a data restoring system according to the invention comprising a digital partial response asymmetry compensation block is shown. The data recorded on an optical recording medium 1 are scanned by an optical pickup unit 2 to obtain an analog data signal RFa. This analog data signal RFa is then digitised by an analog-to-digital-converter (ADC) 3 to obtain a digital data signal RFd. An AC-coupling block (ACC) 4 filters the DC-component in the digital data signal RFd to generate a DC-free digital data signal RF. A sampling rate converter (SRC) 5 resamples the AC-coupled RF signal. The sampling rate is determined by the T-clock, which is generated by a digital PLL block (DPLL) 6. A digital partial response asymmetry compensation block (DPRAC) 7 monitors the asymmetry in the RF signal and dynamically compensates the asymmetrical parts in the RF signal. The compensated RF signal is then equalized by an equalizer block (EQ) 8 and sliced by a slicer block (Slicer) 9, respectively. The sliced RF signal is transmitted to a Viterbi decoder (VD) 10, which delivers at its output a decoded bit stream.

In the DPRAC block 7 the asymmetry strength β is detected by an asymmetry detection block (AD) 71 based on the envelopes of a short T pulse (xT pulse) and a long T pulse (yT pulse). The upper and lower thresholds are then determined by a threshold determination block (TD) 72 based on the asymmetry strength factor β and the xT envelope. Those parts of the input signal RF, which are within the determined upper and lower thresholds, remain unchanged. However, those parts of the input signal RF, which are outside the determined upper and lower thresholds, are asymmetry compensated by an asymmetry compensation block (AC) 73. The result of this processing is a signal quality improvement in the asymmetrical parts of the input signal RF.

According to conventional methods the digitised and AC-coupled RF signal is resampled to a T-clock based RF signal and is then equalized and sliced for the Viterbi decoder 10. For a strong asymmetrical RF signal it is difficult to compensate the asymmetry only with this conventional method. By inserting the digital partial response asymmetry compensation block (DPRAC) 7 between the sampling rate converter 5 and the equalizer 8, the asymmetrical RF signal is dynamically improved for further data processing.

Figure 2:
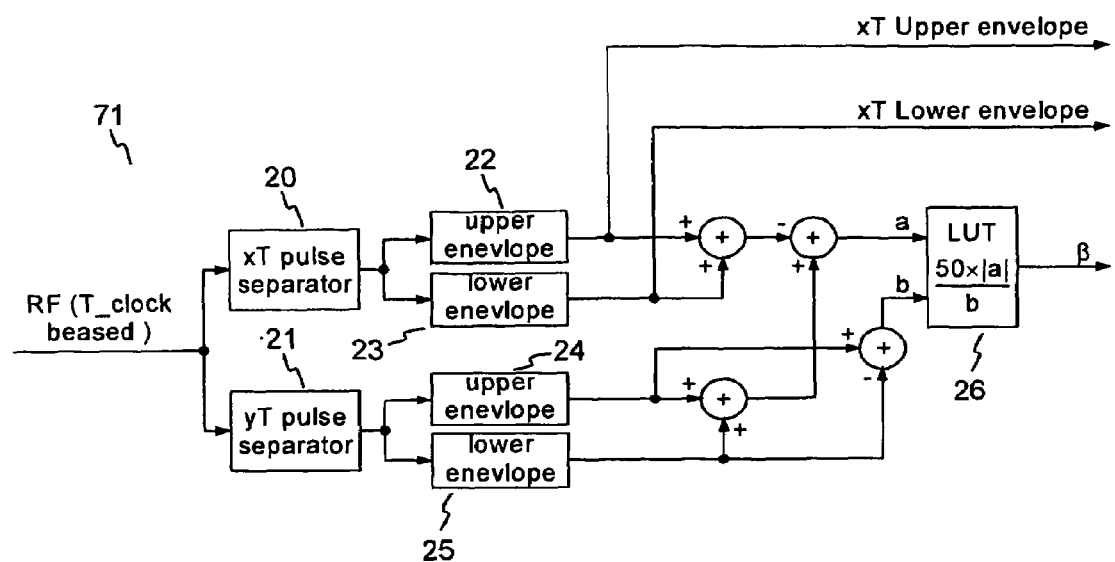
FIG. 2 shows a block diagram of an asymmetry detector, FIG. 3 schematically shows a device for xT pulse separation and upper and lower envelope measurement, FIG. 4 schematically shows a device for yT pulse separation and upper and lower envelope measurement.

As shown in FIG. 1, the DPRAC comprises an asymmetry detector (AD) 71, a threshold determination block (TD) 72, and an asymmetry compensation block (AC) 73. The asymmetry detector 71 is shown in more detail in FIG. 2. In the asymmetry detector 71 the upper and lower envelopes of an xT (short T) pulse as well as the upper and lower envelopes of a yT (long T) pulse are detected. Based on this envelope detection the asymmetry factor β of the T-clock based RF signal is calculated according to the formula:

$$\beta=[(I_{HyIT}+I_{LyT})-(I_{HxT}+I_{LxT})]/[2\times(I_{HyT}-I_{LyT})]$$

The detected xT short pulse upper and lower envelopes and the calculated asymmetry factor β are then output to the threshold determination block (TD) 72.

The asymmetry detector 71 includes several components. The T-clock based input signal RF is analysed by an xT (short) pulse separator 20 and a yT (long) pulse separator 21, whereby the pulses having a pulse length equal to or smaller than xT or a pulse length equal to or greater than yT are separated from the RF signal stream, respectively, according to the zero-crossing information in the input signal RF. The maximum value and the minimum value of each separated xT and yT pulse are detected by respective upper and lower envelope measurement blocks 22, 23, 24, 25. All detected maximum values and minimum values are filtered by a low-pass filter (not shown) and constitute the xT upper and lower envelopes as well as yT upper and lower envelopes, respectively. The calculation of the asymmetry factor β is based on these envelopes. Considering the difficulty of a hardware implementation of a division, a LUT look-up table (LUT) 26 is introduced for implementing the determination of the asymmetry factor β according to $$\beta=50\times abs(a)/b$$

where a is the distance between the middle values of the short pulse xT and the long pulse yT and equals $$a=[(I_{HyIT}+I_{LyT})-(I_{HxT}+I_{LxT}),$$

and b is the peak-to-peak value of the long pulse yT and equals $$b=I_{HyIT}-I_{LyT}.$$

Here the absolute function means that the asymmetry factor β is the same for both positive and negative asymmetrical input signal RF. Basically the asymmetry factor β is smaller than 50 and is greater than or equals 0.

Figure 3:
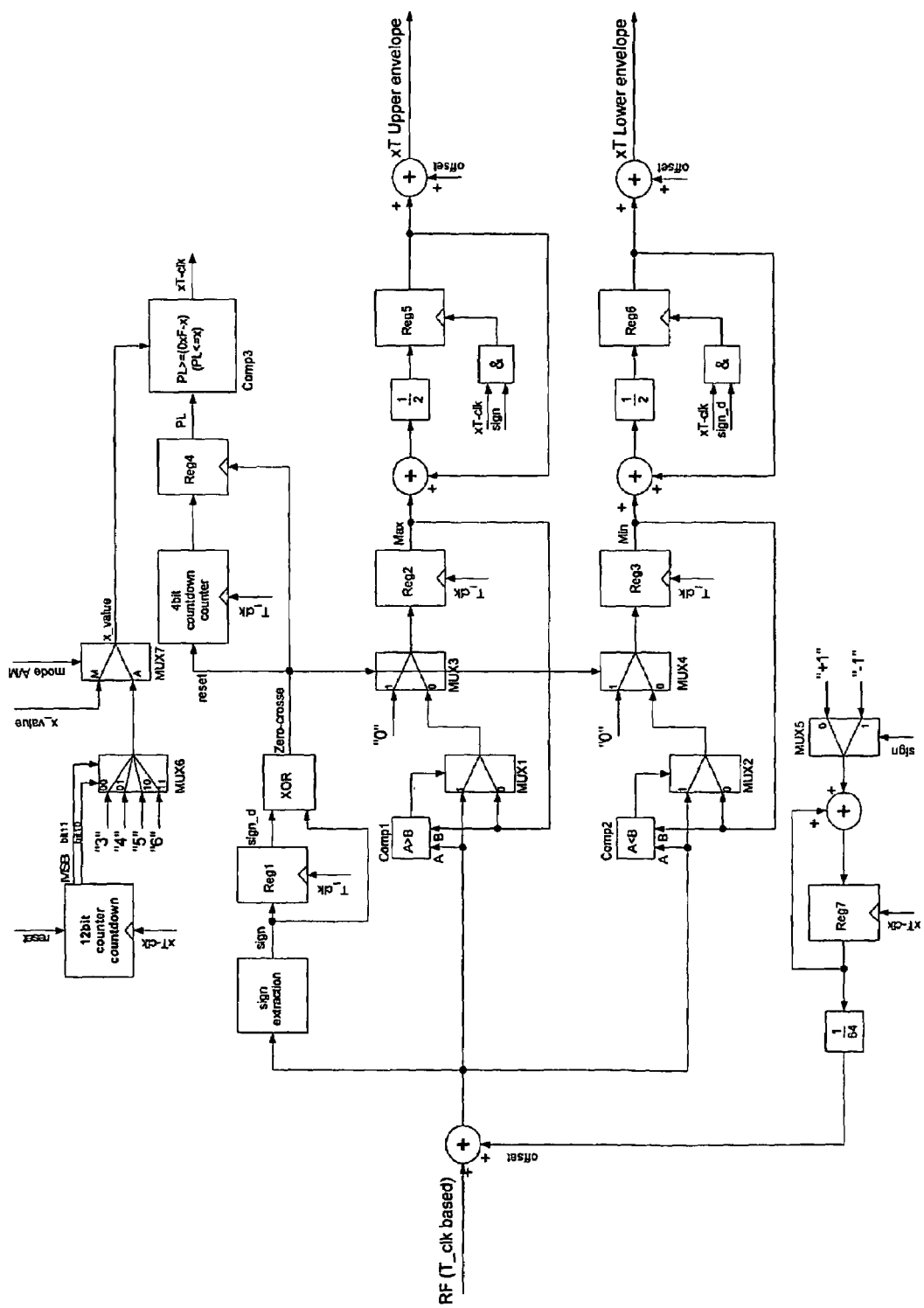

The design of the xT pulse separator 20 is illustrated in FIG. 3. The T-clock based input signal RF is first floated with an offset, which is output from an offset determination block. The floated RF signal is then checked for a zero-crossing T-clock. At the same time a 4 bit count-down counter counts the number of T-clocks from the last zero-crossing T-clock. When the T-clock in which the floated RF signal crosses zero is reached, the current number in the counter is checked if it is the same as xT or smaller than xT. If the last pulse satisfies this condition, its maximum value (for the positive pulse) or minimum value (for the negative pulse) are used for the calculation of the xT envelope. Otherwise it is neglected and does not distribute to the calculation of the xT envelope. The zero-crossing information is obtained from the sign changing of the RF signal. The pulse polarity is determined from the sign of the RF signal at the zero-crossing T-clock. The x value is automatically generated by a 12 bit counter from 6 to 3 in an automatic mode, or it is set to any value by a microprocessor in a manual mode. The automatic mode is designed for automatically searching for the correct zero-crossing position. This is achieved by means of searching for the offset value for floating the input signal RF with consideration of the increasing asymmetry factor β from a 6T-pulse to a 3T-pulse. The offset determination block is designed for searching the position in which the xT pulse distributes similarly on both sides of the floated reference level. In this offset determination block the number of pulses is counted with their polarity and the output of the offset value is proportional to the deviation of the number of the positive and negative pulses. In this way the described method correctly separates the xT pulse from the input signal RF.

Figure 4:
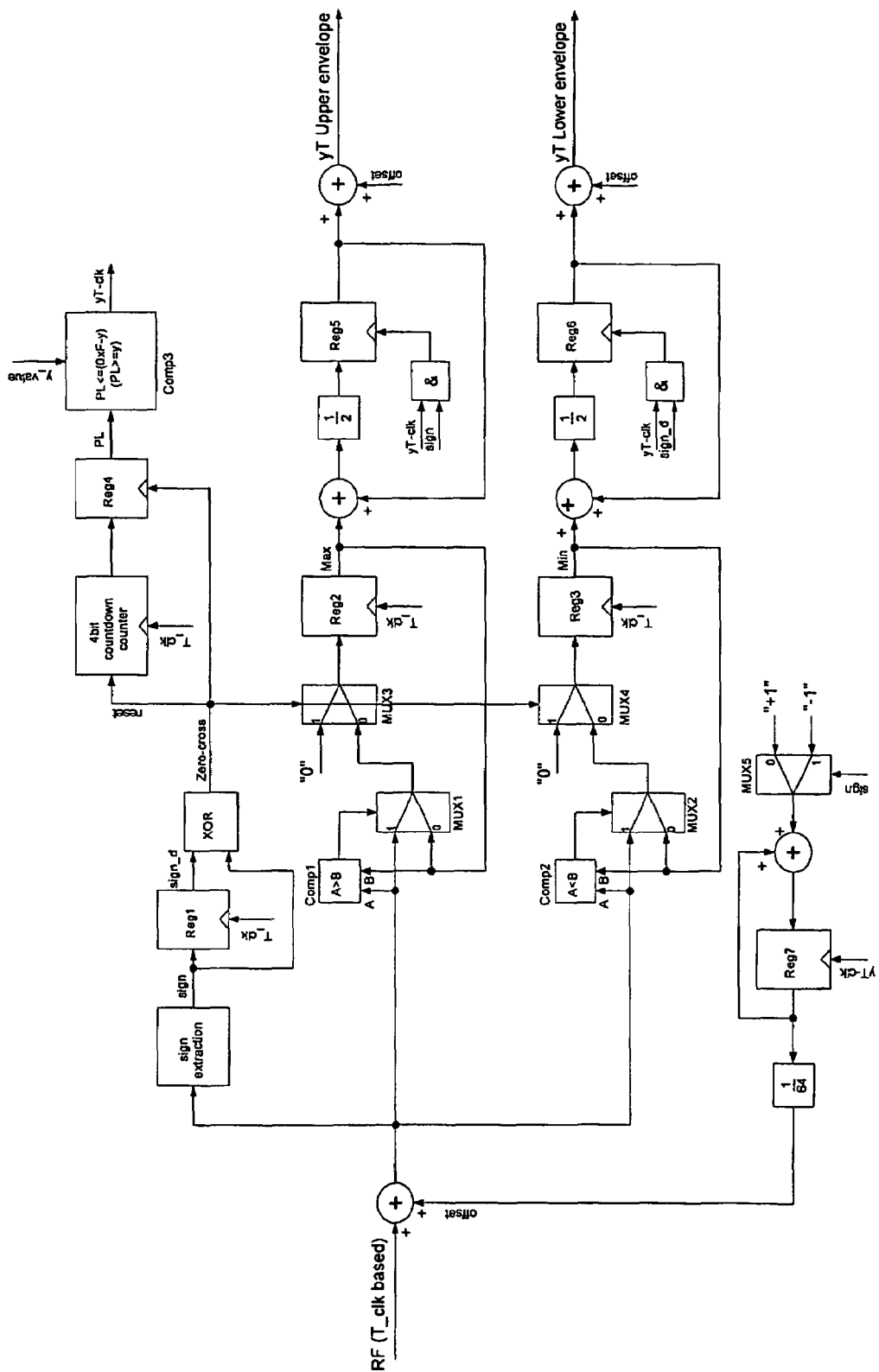

The yT pulse separator 21 works in the same way as the xT pulse separator 20. The specific design is illustrated in FIG. 4. Usually the zero-crossing position of the yT pulse is practically the same as in the AC-coupled RF signal. Here the offset determination block is designed only for the fine adjustment for the yT long pulse. This is the reason why the y value is only needed to be set by the microprocessor. The remaining parts of the yT separator 21 work according to the same principle as the xT pulse separator 20.

FIG. 3 further shows the specific design of the xT upper and lower envelope measurement. The floated T-clock based RF signal is compared with temporal maximum and minimum values and saved in temporal maximum and minimum registers for every T-clock from the last zero-crossing T-clock to the next zero-crossing T-clock. For every zero-crossing T-clock the temporal maximum or minimum value is selected and integrated to a average maximum or minimum value according to the pulse polarity and both temporal maximum and minimum registers are reset to zero. The upper envelope and the lower envelope can also be obtained with a compensation of the floating factor. The working principle is the same for the yT upper and lower envelope measurement, which is further described in FIG. 4.

Figure 5:
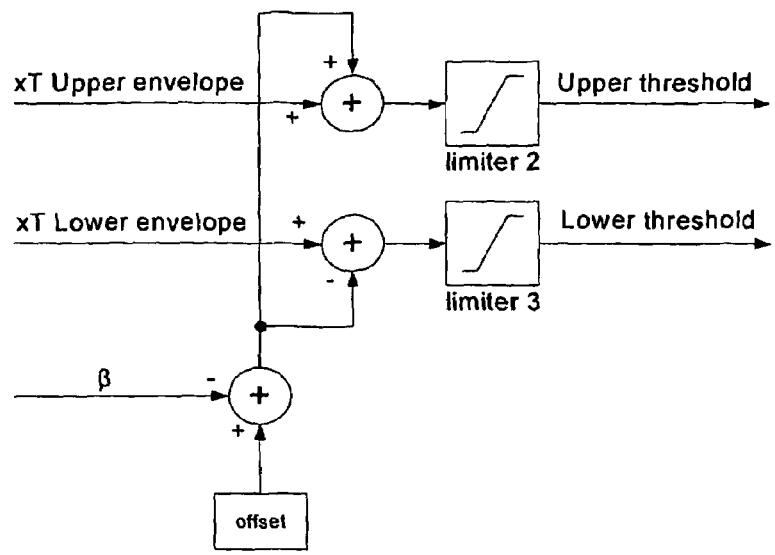
FIG. 5 shows a block diagram for upper and lower threshold determination.

The threshold determination block 72 is explained in more detail in FIG. 5. The upper and lower thresholds determined in this sub-block are used as reference levels for the asymmetry compensation in the asymmetry compensation block 73. The input asymmetry is compensated with an offset. The compensated asymmetry factor β is used for compensation of the upper and lower thresholds, which are based on the xT upper and lower envelopes. The offset is obtained from a microprocessor and used for controlling the strength of asymmetry compensation by changing the distance between the upper threshold and the lower threshold. The compensated upper and lower thresholds are output to the asymmetry compensation block 73 for reducing the RF asymmetry.

Figure 6:
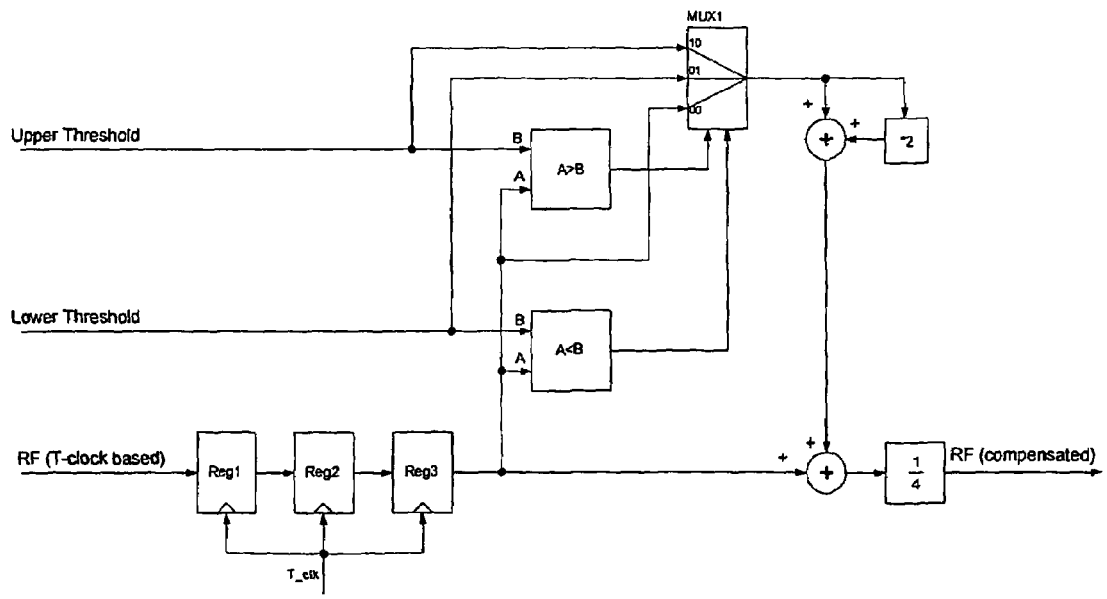
FIG. 6 shows a block diagram for asymmetry compensation.

The working principle of the asymmetry compensator 73 is shown in FIG. 6. The T-clock based RF signal is clipped if it is outside of the upper and lower thresholds. However, the RF signal remains unaltered if it is in between the upper and lower thresholds. In this way the partial response asymmetry compensation is realized. The clipped RF signal is then averaged with the unclipped RF signal with a weighting factor 3. The averaged RF signal is then output as the compensated RF signal to the equalizer block 8. Basically the optical pickup unit 2 loses about −6 dB gain from a frequency of yT (e.g. y=11) to a frequency of xT (e.g. x=3) according to the optical frequency response of the optical pickup unit 2. Therefore, in the asymmetry compensation a weight factor 3 is employed. The 3T-clock delay is applied for synchronizing the input signal RF and the upper and lower thresholds for the xT pulses obtained from the threshold detector 72, which are mostly the 3T pulses. Using this delay every xT is clipped by those upper and lower thresholds, which are generated with the contribution of its maximum or minimum value.

Figure 7:
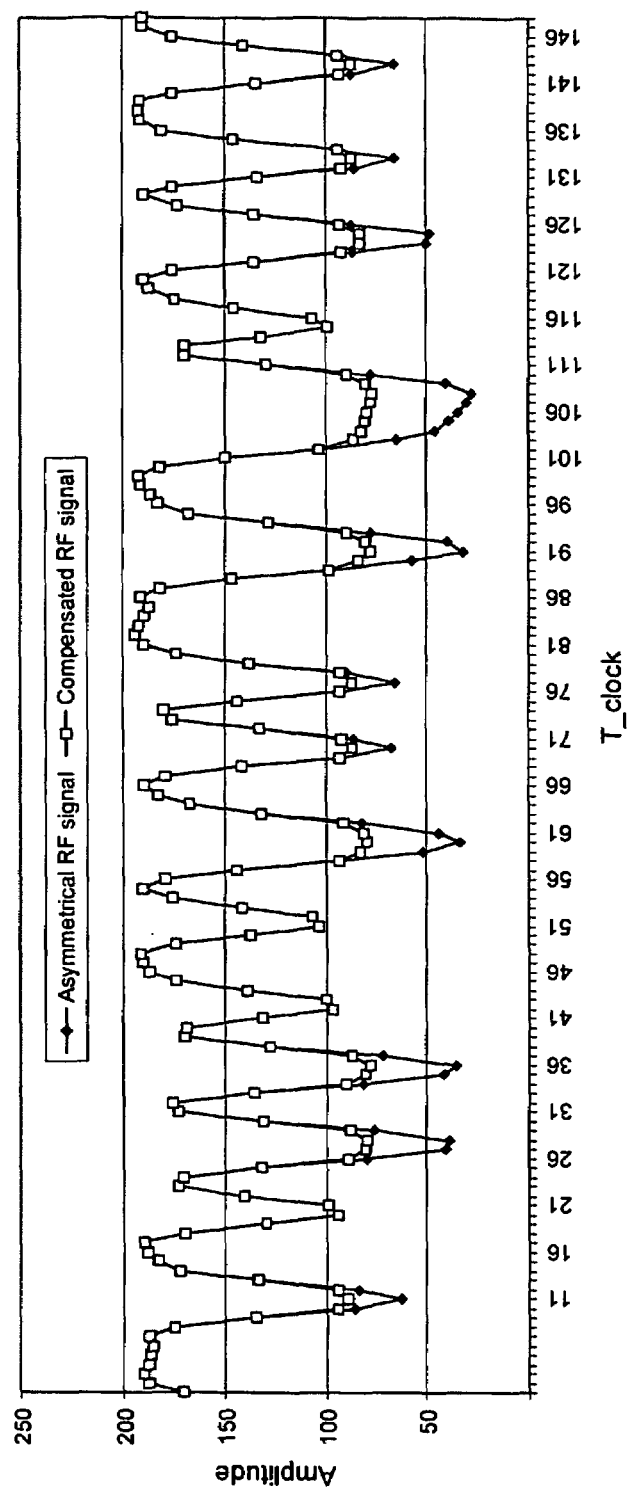
FIG. 7 shows T-clock resampled RF signals before and after the asymmetry compensation.

FIG. 7 shows the result of T-clock resampled RF signals before and after the asymmetry compensation. Obviously, the asymmetry in the asymmetrical input RF pattern in FIG. 7 is reduced from about 15% to less than 3%. By means of the equalizer 8 or other conventional methods, the RF signal processed by the DPRAC is much easier to recover and the bit error rate (BER) is greatly improved.

The solution according to the invention has a plurality of advantages. The asymmetry compensation is achieved in a simple and direct way, the performance of subsequent blocks (equalizer, slicer, Viterbi decoder, etc.) is hardly affected by inserting the asymmetry compensation block. This means that the parameters of these blocks are still optimised. The asymmetrical RF signal is compensated by processing only the asymmetrical parts in the RF signal in order to reduce the asymmetry. The remaining RF signal is, therefore, not influenced by this compensation.

The extent of the asymmetry compensation is adaptable to the extent of signal asymmetry through the asymmetry measurement. By means of this adaptive function, the method can be applied to any RF signal from perfect RF signal (asymmetry is zero) to a worst case RF signal (asymmetry is close to 50%).

There is no additional phase shift and loss of important information within or close to the upper and lower envelopes of the xT pulse, which refers mainly to the zero-crossing points. The inserted asymmetry compensation block causes only a 3T clock delay for clipping synchronization for the 3T clock pulse.

The measurement of the asymmetry factor $\beta$ is a standard asymmetry measurement. The measurement result can be further used by the microprocessor as an indication of the disk quality. It can also be delivered to the subsequent blocks for optimising these blocks (e.g. equalizer, Viterbi decoder, etc.).

The yT upper and lower envelopes can further be used for the analog automatic gain control as well as also for the realization of the digital automatic gain control. In this way an RF signal exhibiting strong amplitude changes (e.g. from a heavy scratched disk) can be improved using this prompt gain control.

The invention claimed is:

1. A method for digital partial response asymmetry compensation of a digital data signal, the method comprising:
   providing pulses of the digital data signal having a pulse length equal to or smaller than a first value to a first signal path and providing pulses of the digital data signal having a pulse length equal to or greater than a second value to a second signal path, the second value being larger than the first value;
   determining an asymmetry value of the digital data signal by measuring envelopes of the pulses in the first signal path and measuring envelopes of the pulses in the second signal path;
   determining upper and lower thresholds by evaluating upper and lower envelopes of the pulses in the first signal path and the asymmetry value; and
   selecting and compensating only asymmetric parts of the digital data signal using the determined upper and lower thresholds.

2. The method according to claim 1, comprising filtering a DC-component in the digital data signal to generate a DC-free digital data signal.

3. The method according to claim 1, further comprising separating pulses having a pulse length equal to or smaller than the first value and pulses having a pulse length equal to or greater than the second value from the digital data signal, respectively, according to a zero-crossing information in the digital data signal.

4. The method according to claim 3, further comprising floating the digital data signal with an offset.

5. The method according to claim 1, wherein measuring the envelopes of the pulses in the first signal path and the pulses in the second signal path comprises:
   detecting a maximum value and a minimum value of each pulse;
   filtering all detected maximum values and minimum values by a low-pass filter.

6. The method according to claim 1, further comprising determining the asymmetry value from a look-up table.

7. The method according to claim 1, further comprising indicating a quality of a recording medium from which the digital data signal is obtained based on the determined asymmetry value.

8. The method according to claim 1, further comprising optimizing subsequent processing blocks using the determined asymmetry value.

9. The method according to claim 1, further comprising performing an analog automatic gain control or a digital automatic gain control using the measured upper and lower envelopes of the pulses in the second signal path.

10. An apparatus for retrieving a digital data signal from a recording medium, wherein said apparatus comprises:
    a first pulse separator configured to provide pulses of the digital data signal having a pulse length equal to or smaller than a first value to a first signal path;
    a second pulse separator configured to provide pulses of the digital data signal having a pulse length equal to or greater than a second value to a second signal path, the second value being larger than the first value;
    an asymmetry detector configured to determine an asymmetry value of the digital data signal by measuring envelopes of the pulses in the first signal path and measuring envelopes of the pulses in the second signal path;
    a threshold determination block configured to determine upper and lower thresholds by evaluating upper and lower envelopes of the pulses in the first signal path and the asymmetry value; and
    an asymmetry compensation block configured to select and compensate only asymmetric parts of the digital data signal using the determined upper and lower thresholds.

11. The apparatus according to claim 10, further comprising an AC-coupling block configured to filter a DC-component in the digital data signal to generate a DC-free digital data signal.

12. The apparatus according to claim 10, wherein the first pulse separator and the second pulse separator are configured to separate the pulses from the digital data signal according to a zero-crossing information in the digital data signal.

13. The apparatus according to claim 12, further comprising an adder configured to float the digital data signal with an offset.

14. The apparatus according to claim 10, wherein for measuring the envelopes of the pulses in the first signal path and for measuring the envelopes of the pulses in the second signal path the apparatus further comprises:
    upper envelope measurement blocks and lower envelope measurement blocks configured to detect a maximum value and a minimum value of each pulse, and
    a low-pass filter configured to filter all detected maximum values and minimum values.

15. The apparatus according to claim 10, wherein the asymmetry detector is configured to determine the asymmetry value from a look-up table.

16. The apparatus according to claim 10, further comprising a microprocessor configured to use the determined asymmetry value as an indication of a quality of a recording medium from which the digital data signal is obtained.

17. The apparatus according to claim 10, wherein the apparatus is configured to optimize subsequent processing blocks using the determined asymmetry value.

18. The apparatus according to claim 10, wherein the apparatus is configured to perform an analog automatic gain control or a digital automatic gain control using the measured upper and lower envelopes of the pulses in the second signal path.

* * * * *